(12) United States Patent
de Pena et al.

(10) Patent No.: US 8,233,194 B2
(45) Date of Patent: Jul. 31, 2012

(54) ISING-MODEL IMAGE RENDITION, AND CONSOLIDATED MASKING AND/OR FILTERING, IN INCREMENTAL PRINTING

(75) Inventors: Alejandro Manuel de Pena, Sant Cugat del Valles (ES); Santiago Garcia Reyero, San Diego, CA (US); Joan Manuel Garcia, Sant Cugat (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1496 days.

(21) Appl. No.: 11/043,587

(22) Filed: Jan. 26, 2005

(65) Prior Publication Data

US 2006/0164688 A1   Jul. 27, 2006

(51) Int. Cl.
*H04N 1/40* (2006.01)
(52) U.S. Cl. ........ 358/3.04; 358/1.9; 358/1.8; 382/275; 382/276; 382/128; 348/245
(58) Field of Classification Search .................. 358/1.9, 358/1.8, 497, 484, 3.03, 445, 448, 3.04, 474, 358/304; 382/237, 276, 128, 152, 252, 275; 348/245, 445; 347/9, 7; 375/240.05; 345/426
See application file for complete search history.

(56) References Cited

U.S. PATENT DOCUMENTS

| | | | | |
|---|---|---|---|---|
| 4,748,515 A | * | 5/1988 | Van Daele et al. | 358/445 |
| 5,014,333 A | * | 5/1991 | Miller et al. | 382/252 |
| 5,163,127 A | * | 11/1992 | Ikumi et al. | 345/426 |
| 5,608,824 A | * | 3/1997 | Shimizu et al. | 382/276 |
| 5,659,355 A | * | 8/1997 | Barron et al. | 348/245 |
| 5,892,841 A | * | 4/1999 | Jochems et al. | 382/152 |
| 5,963,658 A | * | 10/1999 | Klibanov et al. | 382/128 |
| 5,992,962 A | * | 11/1999 | Yen et al. | 347/9 |
| 6,104,502 A | * | 8/2000 | Shiomi | 358/1.9 |
| 6,185,002 B1 | * | 2/2001 | Askeland et al. | 358/1.8 |
| 6,191,820 B1 | * | 2/2001 | Kang et al. | 348/445 |
| 6,359,928 B1 | * | 3/2002 | Wang et al. | 375/240.05 |
| 6,393,161 B1 | * | 5/2002 | Stevenson et al. | 382/275 |
| 6,567,192 B1 | * | 5/2003 | Toyomura et al. | 358/497 |
| 7,003,166 B2 | * | 2/2006 | Abhyankar et al. | 382/237 |
| 7,382,502 B2 | * | 6/2008 | Kita | 358/474 |

OTHER PUBLICATIONS

Gaurav Sharma; Zhigang Fan; Shen-Ge Wang, "Stochastic Screens Robust to Mis-Registration in Multi-Pass Printing" Proc. SPIE: Color Imaging IX: Processing, Hardcopy, and Applications, Jan. 19, 2004, pp. 460-468, vol. 5293, SPIE and IS&T XP002576716, San Jose, CA, US.
Dimitris Anastassiou, "Neural Net Based Digital Halftoning of Images", Jun. 7, 1988, pp. 507-510, IEEE XP010069599, US.
European Search Report; Application No. EP 06100751; search completed Apr. 7,2010.

* cited by examiner

*Primary Examiner* — Mark K Zimmerman
*Assistant Examiner* — Ashish K Thomas

(57) ABSTRACT

One aspect of the method/apparatus finds, for each input-image pixel, an "offset weighted average" of neighboring-pixel interactions—and uses the averages to make a final image. Another aspect assumes a value for each pixel, to use in a final rendered image form—and, at each in a series of approximations, determines whether to change the value, and finds a probabilistic weight to help determine. Yet another finds, for each pixel, a numerical representation of neighboring-pixel interactions—and establishes a distance cutoff for use in defining "neighbor", and uses the representation to decide whether to change color values. Still another finds a desired or ideal number of print passes, and adapts the number of passes actually used to the found number. Another combines halftoning and printmasking into one procedure and prints images prepared thereby. Another integrates halftoning and image filtering, to obtain esthetic visual effects, into one procedure—and prints images thus prepared.

31 Claims, 1 Drawing Sheet

ISING-MODEL IMAGE RENDITION, AND CONSOLIDATED MASKING AND/OR FILTERING, IN INCREMENTAL PRINTING

RELATED PATENT DOCUMENTS

Closely related documents are coowned U.S. utility-patents, hereby incorporated by reference in their entirety into this document. One is U.S. Pat. No. 5,333,243, in the names of Dillinger and Best—good for an introduction to error diffusion, and also for the principle of restricting actually printed color in a particular pixel to one of the input-color components.

Another such patent is U.S. Pat. No. 6,542,258 of Joan-Manel Garcia et al.—teaching novel printmasking techniques, including among others the balancing of randomness and determinism to avoid both excessive granularity and excessive patterning in printed images. Also wholly incorporated by reference in this present document are the other patents and applications identified in the Best/Dillinger and Garcia documents.

Additional patents of interest, likewise incorporated by reference in their entirety into the present document. Are EPO (European Patent Office) patents 571,010 of Balser, 778,696 of Shingu (Canon), 570,722 of von Kienlin, 779,555 of Van Rompuy, and 264,302 of Nakazato, and EPO patent application 595,504 of Pappas.

FIELD OF THE INVENTION

This invention relates generally to machines and procedures for printing text or graphics on printing media such as paper, transparency stock, or other glossy media; and more particularly to such systems and methods that provide rendition (or "halftoning") and printmasking in preparation for printing incrementally (or "digitally")—i.e., by generating one image at a time, and each small portion of the image at a time, under direct computer control of multiple small printing elements. Incremental printing thus departs from more-traditional lithographic or letterpress printing, which creates an entire image with each rotation or impression of a press.

BACKGROUND OF THE INVENTION

Digital as well as traditional printing requires continuous-tone images to be represented by displays and printers that are actually capable of presenting only two, or only a few, distinct tonal levels. Dots must be arranged and printed so that the illusion of the original continuous tone image is presented to the viewer. Digital halftoning provides the mechanism of rendering continuous-tone images with such devices.

1. Rendition

In the last few decades several digital halftoning methods have evolved. Of these established approaches, the best known are matrix-based ordered dither, and error diffusion.

The former can be designed to either cluster or disperse dots, a useful property, but produces a regular, periodically repeating though usually very small cell pattern. This pattern in turn can beat against other periodic structures—such as printmasks, or periodicities in the image data themselves—to generate very conspicuous and undesirable moiré or like patterns.

Error diffusion, on the other hand, advantageously produces only patterns that are aperiodic, and that include very limited low-frequency components. These too are useful properties. Error diffusion, however, also operates by producing dispersed dots—which suffer from start-up delays, extremely directional structures that are sometimes said to appear "wormy" or "crawling", and also an excessive line smudging. This latter drawback is especially objectionable on high-resolution devices and in line drawings.

The directional patterning is particularly conspicuous and objectionable in midtone regions. There it can sometimes happen to be strongly enough developed to superpose on the printed image quite noticeable phantasms that are completely inappropriate to the input image.

Yet another problem of standard error diffusion is color accuracy. Traditional error diffusion called for printing at each pixel whatever colorant (generally cyan, magenta or yellow—or black) had the highest aggregate signal, including input contone (continuous-tone) color for the subject pixel plus accumulated distributions of color error from earlier-processed pixels.

As pointed out in the above-mentioned '243 patent of Best and Dillinger, such earlier-distributed error flows could "diffuse" over long distances before finally happening to arrive at a pixel where they could contribute to an actual printed colorant. Therefore this selection protocol readily produced sprinklings of pixels of colorants that were irrelevant to the specified contone input—green dots in lemons, blue in lawns, and so forth.

Dillinger and Best showed that this objectionable behavior could be mitigated simply by requiring that the printed colorant or colorants be selected from the primary colors which make up the specified contone input. In fact this tactic works very well to eliminate the specific type of error identified above.

It also implies, however, that even higher levels of earlier-distributed error residuals are flowing in the data array, unrelieved by use in a printout. These unresolved residuals propagate right through—without stopping in—areas where they would already have accumulated enough calorimetric mass to be relieved in a printout, but for the Dillinger/Best constraint.

In consequence, concentrations of specific colorants can appear in areas where the input contone values provide only what might be called an excuse or "justification" for them. These concentrations can be disproportionate to the magnitude of the "excuse"; and also may be even more remote from the original input color components that contributed to the heavy residual error flows.

The Best/Dillinger methodology makes no attempt to avoid the directionality of standard error-diffusion processing, or the resulting sometimes-bizarre shapes or patterns. This problem, however, is addressed by the above-mentioned patent documents of Balser, Pappas and Johnston, and Nakazato—and also of Van Rompuy and Van Hunsel (but not for incremental printing).

Those documents may seem to suggest variation of standard error diffusion—i.e. not the salutary color-constrained refinement of Dillinger and Best—by following a random walk through the data array rather than proceeding systematically in row and column order. This nondirectional processing path yields an output character that is correspondingly nondirectional, which should effectively eliminate the crawling or wormy patterns.

In such variants the distribution of error from each processed pixel need not, at least in principle, be limited to the directions that are adopted in standard error diffusion. Rather the distribution can if desired be omnidirectional; these assumptions in turn lead to determining the final rendered form of the image as the end product of a series of successive approximations to the overall image.

Although such variants are likely to be far more computation-intensive than standard (directional) error diffusion, this drawback need not be fatal—especially not in the context of highest-quality imaging requirements. High-end printers and their typically very demanding applications can accept a certain degree of added processing time in return for markedly improved output quality.

Market interest in desktop printers, digital copiers and other types of reproduction equipment continues to increase. The demand for faster and more efficient halftoning methods has forced algorithm designers to push the current implementations to their limits.

In order to allow further evolution of digital printing to meet future demands, a fundamental change must occur in the halftoning process itself. The challenge is to design a halftoning algorithm that combines the advantages of both traditional categories and can push their limits in an intuitive way that allows for straightforward customization.

Some efforts in that direction, while admirable, have not yet completely achieved the goal. Specifically, the Dillinger/Best constraints make a major improvement in color accuracy by preventing dots of certain colors from printing where those colors are entirely foreign or irrelevant—but do not prevent such dots from printing where the response is merely very disproportionate but not completely irrelevant. Dillinger and Best offer no mitigation of the directionality problems.

The random-walk suggestions of Balser and the others, conversely, may represent a major improvement in non-directionality, and the resulting patterns—but again fail to address the application of color dots that are irrelevant or disproportionate. It has perhaps never been proposed to combine the teachings of these references with those of Best and Dillinger; but even if they were combined there would remain no resolution of the disproportionate response to remote error sources.

Yet another drawback—perhaps not well recognized—of known rendition methods is that properties of the final output image as rendered, in particular the quality and fidelity of the image as it will be printed, may not be assessed, or not assessed adequately, in performing the rendition. As a result the process may produce image quality that does not adequately repay the investment in rendering, either because excess time is spent in the process or because the image is poor—or both.

Still another drawback is that conventional rendering programs, which require relatively high storage capacity, ordinarily make no contribution to the following downstream stage of printing makeready—namely printmasking. Whether implemented in hardware, firmware or software, these two kinds of computation-intensive programs are entirely independent; and the program storage needs are essentially duplicative. In other words the storage is used inefficiently.

Furthermore, apart from storage, the actual processes of marching through the data array are also performed twice—once for rendering and again for masking. This is true even though many of the operations at each pixel, for the two processes, are closely related: establish some measure of proximity for pixels that will be considered "nearby", and consider the influence of those nearby pixels, and apply some resultant of that influence to a decision about the subject pixel; and, finally, implement that decision.

Again another drawback in some or all conventional rendering is that the process steps are not readily made to take into account the local properties of the input image—for instance its local gray areas and gradients. The resulting image is therefore not fine-tuned for those local properties, or here too the processing may require more computing power or more time than fundamentally necessary. A similar observation applies to handling of interactions between the image data and the rendering, especially some interactions that can cause clustering (graininess in the image) and other undesirable effects.

In addition, some conventional rendering processes that are useful in single-bit binary printing may become quite unwieldy when applied to multilevel printing (e.g. marking systems that use two- or three-bit colorimetric data depth). Hence a further duplication of program storage requirements arises if a single printer is to be provided with marking capability in more than one bit depth. Precisely that kind of versatile operation, however, is particularly advantageous in high-end printers to allow quick, efficient output of a rough draft—or of a commercial-graphics project or other image that intrinsically needs only two or four levels, rather than four or eight.

The foregoing discussion of digital rendition (or "halftoning") methods is relevant to the present invention, which provides advantageous alternative rendition methods. The invention, however, also has application to digital or "incremental" printing makeready techniques known as "printmasking". following is a discussion of the reasons for printmasking, and some known considerations for optimizing such masking.

2. Printmasking

To achieve vivid colors in inkjet printing with aqueous inks, and to substantially fill the white space between addressable pixel locations, ample quantities of ink must be deposited. Doing so, however, requires subsequent removal of the water base—by evaporation (and, for some printing media, absorption)—and this drying step can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium. Various techniques are known for use together to moderate these adverse drying-time effects and bulk- or gross-colorant effects.

(a) Prior heat-application techniques—Among these techniques is heating the inked medium to accelerate evaporation of the water base or carrier. Heating, however, has limitations of its own; and in turn creates other difficulties due to heat-induced deformation of the printing medium.

Glossy stock warps severely in response to heat, and transparencies too can tolerate somewhat less heating than ordinary paper. Accordingly, heating has provided only limited improvement of drying characteristics for these plastic media.

As to paper, the application of heat and ink causes dimensional changes that affect the quality of the image or graphic. Specifically, it has been found preferable to precondition the paper by application of heat before contact of the ink; if preheating is not provided, so-called "end-of-page handoff" quality defects occur—such defects take the form of a straight image-discontinuity band formed across the bottom of each page when the page bottom is released.

Preheating, however, causes loss of moisture content and resultant shrinking of the paper fibers. To maintain the paper dimensions under these circumstances the paper is held in tension, and this in turn leads to still other dimensional complications and problems.

(b) Prior printmode techniques—Another useful technique is laying down in each pass of the pen only a fraction of the total ink required in each section of the image—so that any areas left white in each pass are filled in by one or more later passes. This tends to control bleed, blocking and cockle by reducing the amount of liquid that is all on the page at any given time, and also may facilitate shortening of drying time.

The specific partial-inking pattern employed in each pass, and the way in which these different patterns add up to a single fully inked image, is known as a "printmode". Artisans in this field heretofore have developed many different variations and elaborations of printmodes—and in general many of these techniques have been found to introduce their own backward steps for each forward step.

For example, some printmodes such as square or rectangular checkerboard-like patterns tend to create objectionable moiré effects—just as noted earlier for dither masks—when frequencies or harmonics generated within the patterns are close to the frequencies or harmonics of interacting subsystems. Such interfering frequencies may arise, for example, in subsystems sometimes used to help control the paper advance or the pen speed.

(c) Directional effects—Another problem related to printmode techniques is that these techniques, like error diffusion, can produce undesired directional patterning, particularly if printmasks are generated by algorithms which themselves proceed directionally. As will be seen, this problem is avoided inherently through application of the present invention to generate printmasks.

(d) Known technology of printmodes: general introduction—One particularly simple way to divide up a desired amount of ink into more than one pen pass is the checkerboard pattern mentioned above: every other pixel location is printed on one pass, and then the blanks are filled in on the next pass.

To avoid horizontal "banding" problems (and sometimes minimize the moire patterns) discussed above, a printmode may be constructed so that the paper advances between each initial-swath scan of the pen and the corresponding fill-swath scan or scans. In fact this can be done in such a way that each pen scan functions in part as an initial-swath scan (for one portion of the printing medium) and in part as a fill-swath scan.

Once again this technique tends to distribute rather than accumulate print-mechanism error that is impossible or expensive to reduce. The result is to minimize the conspicuousness of—or, in simpler terms, to hide—the error at minimal cost.

(e) Space- and sweep-rotated printmode masks—The pattern used in printing each nozzle section is known as the "printmode mask". The term "printmode" is more general, usually encompassing a description of a mask, the number of passes required to reach full density and the number of drops per pixel defining "full density".

A relatively full discussion of so-called "rotation" of masks, including "autorotating" masks in which rotation occurs even though the pen pattern is consistent over the whole pen array and is never changed between passes, appears in patents issued to Lance Cleveland and assigned to Hewlett-Packard.

3. Throughput and Other Handicaps of Conventional Rendition and Printmasking

Yet another backward step that accompanies the benefits of printmodes is a penalty in throughput, or overall printing speed. Throughput is one of the critical competitive vectors for inkjet printers.

One of the main throughput limiters is the need to divide the printing of a given area into several scans, or passes, due mostly to restrictions in the amount of ink that the medium can accept in a single pass, but also to the desire for limiting objectionable artifacts created by registration errors.

Although these facts are well known, an aspect of printmodes that generally goes unrecognized is that much of the throughput degradation for an overall image is incurred only because of masking requirements for just a portion of the image. The rest of the degradation is essentially wasted.

Incremental printers heretofore have been programmed to choose a printing strategy, or printmode, initially—most commonly according to a user's mode selection—and thereafter to use that printmode choice throughout each plot. A printmode, however, represents a trade-off between quality and throughput, given by the choice of number of passes and printing speed.

Choosing the number of passes at the outset, and using it throughout the plot as described above, is therefore a simplification that pays a significant throughput penalty.

The inkjet-printing. "pipeline" is a series of transformations through which image data pass, in order to prepare the data for printing the image. A simplified view of the pipeline has three main steps:

Color-space conversion—The image is transformed from the original color space to match the color capabilities of the printer. In a four-pen printer, for example, an eight-bit-per-pixel RGB image is transformed into an eight-bit-per-pixel CMYK image.

Bit depth reduction, or halftoning—The printer will be able to deposit only a small amount of ink per pixel, typically one, two or three droplets. The pixels in the input image, at eight bits per pixel and a full range of 256 possible colors, most typically have to be converted to a single bit, i.e. a 1 or a 0 (fire or don't fire).

The halftoning process accomplishes this by selecting the pixels to print so that the average density of drops will give a visual impression which matches the level on the original image. Bit depth reduction is achieved, essentially, by selecting where to print.

Pass separation, or masking—In most cases the printer cannot print all the drops in one scan across a page, for reasons discussed above. These include constraints on the amount of ink that the printing medium is able to tolerate, the frequency at which the nozzles can fire, and the desire to spread registration errors in such a way that the printed result does not have objectionable artifacts.

The conventional masking solution to this problem is to scan over the medium several times, each time firing a fraction of the drops and advancing the medium. Thus the word "masking" means, in essence, selecting when to print each drop.

There are strong interactions between these last two parts of the printing pipeline. Perhaps the most basic is that they both apply a selection step to the pixels: the halftoning decides which ones will be printed, and the masking decides which ones, out of those, will be printed in a given pass—or, to put in another way, which pixels will be printed in which passes.

Both halftoning and masking algorithms are carefully designed so that the two selections result in pleasing patterns, without discernible artifacts. A problem appears when the two selections are combined, because the combination of two individually pleasing patterns is not necessarily pleasing.

This is probably the most fundamental problem in mask design. The mask designer tries to select the best possible pattern to be deposited at each pass, but in the end the pattern actually printed will be a combination (an "AND" step) of the mask pattern with the pattern selected by the halftoning.

The mask designer, therefore, never really knows how the mask is actually going to look on paper. Beats (interferences) between halftoning and masking at related frequencies are not the only interaction between masking and halftoning.

4. Conclusion, as to Background

In summary, achievement of uniformly excellent inkjet printing continues to be impeded by the above-mentioned problems of directionality, disproportionate color response, absence of quality-information feedback, failure to share storage space and processing steps, and failure to take into account local properties of the image being rendered—as well as the interaction of such properties with the rendering process itself. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is an image-processing method for use in printing based on a digital-array representation of an input image. The phrase "image-processing" encompasses, among other things, either image rendering or print-masking—or both.

The method includes the step of calculating what will herein be called an "offset weighted average" of neighboring-pixel interactions with a particular pixel. (The meaning of the phrase "offset weighted average" will be made clear shortly.)

The phrase "neighboring-pixel" does not necessarily require that the calculations involve only the nearest-neighbor pixel(s); but does not extend to requiring involvement of the most-remote pixels in the array, either. In essence this phrase encompasses essentially any reasonable degree of localism, such as will be clear to people skilled in this field. If desired, the influence of pixels at various distances can be distance-weighted.

This calculating step is performed for substantially each particular pixel in the digital array. The word "substantially" is included here to make clear that the definition of this aspect of the invention is not to be circumvented—as most people skilled in this field will readily understand—by mere superficial or perfunctory exceptions to the literal language "performed for each particular pixel".

For example, the term "substantially" appears in certain of the appended claims. In such cases a claim shall not be avoided merely by skipping the calculating step with respect to some relatively few pixels, or only from time to time, or briefly; and so forth.

Also included is the step of using the offset weighted averages. They are used in developing a final processed form of the image.

The foregoing may represent a description or definition of the first aspect or facet of the invention in its broadest or most general form. Even as couched in these broad terms, however, it can be seen that this facet of the invention importantly advances the art.

In particular, for rendering applications as will be seen the use of offset weighted averages facilitates one particularly positive escape from the undesirable directional operation of conventional error diffusion. This method thus also escapes from the resultant directional patterning that is common in conventional error diffusion.

What is more, as compared with the random-walk versions of error diffusion introduced by Balser and others mentioned earlier, this first aspect of the present invention has the advantage of freedom from rigid calorimetric error accounting. As will be recalled, even the Dillinger/Best method suffers from disproportionate color incursions due to long-distance diffusion and concentration of errors from generation points remote in the image.

At the same time this form of the invention avoids the repetition inherent in dither masking. The benefit here is greatly reduced susceptibility to interference patterns such as moiré.

Furthermore for printmasking applications the offset weighted averages of this first facet of the invention offer a simplification and efficiency in overall operations. A single relatively simple core program module—implemented e.g. in highly optimized hardware—can be made to do double duty in performing tasks associated with both rendering and masking.

Although the first major aspect of the invention thus significantly advances the art, nevertheless to optimize enjoyment of its benefits preferably the invention is practiced in conjunction with certain additional features or characteristics. In particular, preferably also included is the step of determining changes in the averages, at substantially each stage in a series of successive approximations to a final processed form of the image.

Here too the word "substantially" is included to make explicit that a competitor cannot avoid this description—or the sweep of corresponding claim language—by perfunctory tactics. For example it cannot be avoided merely by omitting the determining step only occasionally, or for only some inconsequential number of stages, etc.

Yet another basic preference is using the changes themselves to decide whether a value for the particular pixel, at a particular stage, should be changed in that particular stage to a different value in the next stage. In other words, quantities associated with the determined changes (or prospective changes) in the averages are applied to establish whether a particular value is to be changed or is to remain as it is.

Another preference is that the calculating step include finding each offset weighted average as $$\frac{S_{jk} + i_j}{S_k + 1}$$

where:
$S_{jk}$ represents the sum of products of the assumed value for the particular pixel j with weighted influences by neighboring pixels k,
$i_j$ represents possible values for a particular pixel j, and
$S_k$ represents the sum of the influences of the neighboring pixels k.

If this basic preference is observed, then it will be clear that preferably each weighted average is offset from a simple weighted average by the effect of the terms $+i_j$ and $+1$, in numerator and denominator respectively. In this case it is further preferable that, for a binary-value system, a particular binary value selected for the term $+i_j$ depends upon algebraic sign of the value $i_j$; and for a multiple-discrete-value system, a particular discrete value selected for the term $+i_j$ depends upon a digital resolution, within the available multiple values, of the value $i_j$.

In this latter case there are multiple values to consider at each point in the procedure. (For purposes of this document the terms "multiple" and "multiplicity", and the prefix "multi-", mean "three or more".)

There are several other basic preferences. In particular, preferably the method includes no explicit distribution of error in an intermediate-stage value for a pixel, after its calculation, to neighboring pixels. Preferably the using step includes calculating a probabilistic weight for use in determining whether to change the assumed value of the particular pixel.

Preferably the using step further includes applying a randomly selected discriminator to perturb the calculated probabilistic weight, in determining whether or not to actually perform the value change. As a practical matter in a bilevel system such a value change ideally takes the form of a level flip. Preferably the method also includes the step of finding the final processed form of the image, through convergence of a multiplicity (i.e., at least three) of the successive approximations.

Preferably each particular pixel in the digital array is selected in turn by random walk thru the array. Preferably the calculating, determining and using steps include defining discrete levels and the error (if any) between each of them and the true contone level at each pixel; but no explicit distribution of error from each pixel, after its calculation, to neighboring pixels.

If this last-mentioned basic preference is observed then two alternative subpreferences come into play: preferably the discrete levels are two binary levels, or are multiple levels.

Also there are two other basic preferences. The image processing preferably includes image rendering in preparation for incremental printing, or includes print-masking in preparation for incremental printing.

In preferred embodiments of its second principal or main independent facet or aspect, the invention is an image-rendering method, for use in printing based on a digital-array representation of an input image. The method includes the step of assuming a specific discrete value for use in a final rendered form of the image. This step is performed for substantially each particular pixel in the digital array.

Another step is determining whether to change each discrete value to a different discrete value. This step is performed at substantially each stage in a series of successive approximations to a final rendered form of the image.

A further step, also performed for substantially each stage, is calculating a probabilistic weight for substantially each pixel, to use in the determining step. By a "probabilistic weight" is meant a number or equivalent which operates, or which the host system applies, to control relative likelihood (or in some cases frequency) of occurrence of a particular change of value.

The term "substantially", appearing four times in this description of the second main facet of the invention, once again is included to make clear that a method comes within this form of the invention even if the "assuming" step is omitted for some small number of pixels, or the determining step omitted at some trivial number of stages, or the calculating step omitted for some unimportant number of stages or pixels.

The foregoing may represent a description or definition of the second aspect or facet of the invention in its broadest or most general form. Even as couched in these broad terms, however, it can be seen that this facet of the invention importantly advances the art.

In particular, use of a probabilistic approach facilitates techniques for shepherding the overall image toward a desired condition, progressively—consistent with the above-mentioned use of successive approximations. This method advances the data array as an entirety toward a desired rendered state, rather than snapping each individual pixel deterministically and only once into a final condition as in conventional error diffusion—but also without resort to repeating patterns as in dithering.

The invention thus, once again, thereby helps to enable rendering with neither directional nor periodic patterning. As compared with the random-walk version of error diffusion, the second main facet of the invention has the advantage of avoiding the same inflexible error-fragment arithmetic that forces conventional error diffusion to propagate error into inappropriate image regions as discussed earlier, and also avoiding the inefficiency of using memory storage and processing time for only rendition or only printmasking.

Although the second major aspect of the invention thus significantly advances the art, nevertheless to optimize enjoyment of its benefits preferably the invention is practiced in conjunction with certain additional features or characteristics. In particular, in the event that the method is for use particularly in incremental printing—from the digital representation that numerically approximates a substantially continuous-tone input image—then preferably the calculated probabilistic weights, considered in the aggregate, operate to drive the overall array of values toward a final form that visually approximates the continuous-tone input image.

It is also preferable, but as a matter of the operating context or environment of the invention, that the discrete values be arrayed on a scale which is at least eight times more granular than that of the digital input array. In effect this is only a mathematical expression of the idea that the system is in fact performing halftoning—i.e., reducing bit depth, by trading it off for spatial averaging. For example, if the data are all expressed in the binary system but with various numbers of bits, then preferably there are at least three bits fewer in the discrete values of the rendered image than in the input data.

In other words if two hundred fifty-six calorimetric levels are recognized in the digital input data (i.e., eight-bit binary), then preferably the number of discrete values in the rendered image will be no greater than 256/8=32 values (8−3=5-bit binary). Alternatively if the rendered image is simple one-bit binary, then preferably the number of calorimetric levels in the input data is at least 2×8=16 levels (1+3=4-bit binary).

Another basic preference is that the series include a multiplicity of the successive approximations; and that the method further include the step of finding the final rendered form of the image through convergence of the multiplicity of successive approximations. In this case, then a subpreference is that the multiplicity is between three and six, inclusive, successive approximations.

Some special cases departing from this preference include so-called "images" of a solid color, for example in particular an all-black image. Such an image can ordinarily be made to converge in just one step.

More generally, convergence is assessed simply by observing that the overall array of successive values is not changing, or is changing much less sensitively than earlier. Use of various sorts of randomized processing in different parts of the procedure helps to maintain an orderly convergence, as for example to avoid allowing the system to gravitate to only a local maximum or local minimum rather than a true optimum state.

Thus it will be understood that preferably the method also includes the step of applying a randomly selected discriminator to perturb the calculated probabilistic weight, in determining whether or not to actually perform a particular value change. A discriminator is generally a number that is compared with the weight, to generate a go/no-go decision whether to change value or not.

Some time-variation in the discriminator is ordinarily needed to expand, or disperse, the results of applying the so-called "probabilistic" weights. If the weights were allowed to operate unperturbed, then (unless alternative measures were taken) a weight exceeding one-half would always produce a value change—and a weight under one-half would never do so.

Thus, to moderate or mediate this rigid pattern, even a discriminator selected systematically (e.g., stepwise according to a preestablished schedule) can serve to somewhat diffuse the pattern of resulting decisions. It would threaten, however, to reintroduce patterning of undesirable kinds, such as for example the patterning seen in dithering systems.

Hence a randomly or pseudorandomly chosen discriminator does a better job of expressing the probability distribution that is implicit in use of the probabilistic weights. Such a randomized discriminator scatters the final resulting output levels more smoothly.

Another preference is that each particular pixel in the digital array be selected in turn by random walk thru the array. Another is that the method include no explicit distribution of error in the rendered value of a pixel, after its calculation, to neighboring pixels.

In preferred embodiments of its third major independent facet or aspect, the invention is apparatus for forming a desired input image based on a digital-array representation of the input image. The apparatus includes some means for assuming or establishing a specific discrete value for use in a rendered form of the image, at each particular pixel in the digital array. For purposes of generality and breadth in discussion of the invention, these means will be called simply the "assuming means".

Also included are some means for determining whether to perform a particular candidate change of each value to a different value, at substantially each stage in a series of successive approximations to a final rendered form of the image. These means, again for breadth and generality, will be called the "determining means". The idea of a "final rendered form" ordinarily relates to forms of the image as actually presented to view by human observers—with apparent colors formed, to at least some degree, by visual averaging of plural pixels.

The third facet of the invention also includes some means for obtaining a randomly or pseudorandomly selected discriminator for application by the determining means, in deciding whether to change substantially each value at substantially each stage. These means, once again, will be called the "obtaining means".

The foregoing may represent a description or definition of the third aspect or facet of the invention in its broadest or most general form. Even as couched in these broad terms, however, it can be seen that this facet of the invention importantly advances the art.

In particular, as will be seen the use of a discriminator that can be called "randomized" has the beneficial effect of diffusing or dispersing the relatively quantized colorimetric levels that can otherwise arise in various forms of the determining step. More specifically, in such forms of the invention this facet of the invention thereby tends to suppress objectionable color contouring.

Although the third major aspect of the invention thus significantly advances the art, nevertheless to optimize enjoyment of its benefits preferably the invention is practiced in conjunction with certain additional features or characteristics. In particular, preferably the determining means compare the discriminator with a property of each candidate change of value.

Also preferably the property is a probabilistic weight that describes the desirability of performing the candidate change of value. If this preference is observed, then it is further preferable that the series include a multiplicity of the successive approximations—and further that the apparatus also include means for finding the rendered form of the image in a final version, through convergence of the multiplicity of successive approximations.

In the case of apparatus using probabilistic weights, and particularly for apparatus that operates by convergence of multiple successive approximations, the significance of the randomized discriminator is particularly easy to see. In a putatively probabilistic environment, without a random element the system might not reliably converge, or at least not to an optimum array—one that ideally approximates the input data array.

This may be particularly troublesome for calorimetric values near one or the other end of the dynamic range, i.e. in deep shadow or strong highlights, as for instance contone=200. Another adverse result is likely to be repetitive patterning, and color contouring. It will be seen that the random properties of the discriminator control the rate of convergence.

Various other preferences discussed above for the first two facets of the invention apply here as well—including e.g. the preferred selection of each particular pixel in the digital array in turn by random walk through the array; and the absence of means for explicit distribution of error in the rendered value of a pixel, after its calculation, to neighboring pixels.

In preferred embodiments of a fourth primary facet or aspect, the invention is an image-processing method, for use in printing based on a digital-array representation of an input image. The method includes the step of, for substantially each particular pixel in the digital array, calculating a numerical representation of neighboring-pixel interactions with the particular pixel.

The method also includes the step of establishing a distance cutoff for use in defining what constitutes a neighboring pixel for use in the calculating step. (This step may be regarded as somewhat counterintuitive, since any cutoff, whether arbitrary or based upon some criterion, has the effect of discarding data.)

Yet another step is using the numerical representation to decide whether a color value for the particular pixel should be changed to a different color value. A principal advantage of this fourth aspect of the invention is that it can provide a greatly reduced computation load by eliminating calculation of all interactions beyond some specified distance from the particular pixel.

In preferred embodiments of its fifth major independent facet or aspect, the invention is an image-processing method, for use in printing based on a digital-array representation of an input image. The method includes the step, for each of plural regions of the input image, respectively, determining a number of printing passes that is desired or ideal.

The method also includes the step of adapting the number of printing passes actually used, in at least some plural regions of the image, to the determined number. The foregoing may represent a description or definition of the fifth aspect or facet of the invention in its broadest or most general form. Even as couched in these broad terms, however, it can be seen that this facet of the invention importantly advances the art.

In particular, this method entirely avoids the previously described problem of discarding valuable throughput capability by setting the number of printing passes at the outset—to a value that is the most demanding for the entire plot.

Nevertheless to optimize enjoyment of its benefits preferably the invention is practiced in conjunction with certain additional features or characteristics. In particular, preferably the fifth aspect or facet of the invention is practiced together with the first four discussed above, and also with the sixth facet or aspect introduced below.

In preferred embodiments of its sixth major independent facet or aspect, the invention is an image-processing method, for use in printing based on a digital-array representation of an input image. The method includes the step of combining matrix-based halftoning and printmasking into an integrated procedure.

It also includes the step of printing the image with the image halftoned and printmasked by the integrated procedure. The foregoing may represent a description or definition of the sixth aspect or facet of the invention in its broadest or most general form. Even as couched in these broad terms, however, it can be seen that this facet of the invention importantly advances the art.

In particular, this sixth facet of the invention essentially eliminates all of the previously discussed drawbacks and downsides of separate, uncoordinated printmasking and rendering. Although the sixth major aspect of the invention thus significantly advances the art, nevertheless to optimize enjoyment of its benefits preferably the invention is practiced in conjunction with certain additional features or characteristics.

In particular, preferably the integrated procedure includes a single step that effects both halftoning and printmasking. Another preference is that the halftoning mask be quantized into as many receptacles as the maximum number of passes required or desired. If this basic preference is observed, then a further preference is that the receptacles not all be the same size.

Another basic preference is that the number of passes used in at least some of plural regions in the image be adapted to the maximum number of passes required or desired in the regions, respectively. In this case, two subpreferences are that, in at least some of the plural regions, unneeded passes be skipped—and also that, in at least one particular region, passes that are available by reason of required or desired passes in a nearby region be used even though not required in the particular region. Yet another basic preference is that the integrated procedure determines, for each element of the array, whether or not to print in each pass.

In preferred embodiments of its seventh major independent facet or aspect, the invention is an image-processing method, for use in printing based on a digital-array representation of an input image. The method includes the step of combining halftoning and image filtering, to obtain esthetic visual effects, into a single integrated procedure.

The method also includes the step of printing the image with the image halftoned and filtered by the integrated procedure. The foregoing may represent a description or definition of the seventh aspect or facet of the invention in its broadest or most general form. Even as expressed in these broad terms, however, it can be seen that this facet of the invention importantly advances the art.

In particular, this aspect of the invention yet further extends the surprising efficiencies of simultaneous halftoning and printmasking discussed above.

Although the seventh major aspect of the invention thus significantly advances the art, nevertheless to optimize enjoyment of its benefits preferably the invention is practiced in conjunction with certain additional features or characteristics. In particular, preferably the integrated procedure is performed substantially by an Ising-model process, in which convolution weights are assigned to perform both the halftoning and filtering substantially simultaneously.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. Introduction

Figure 1:
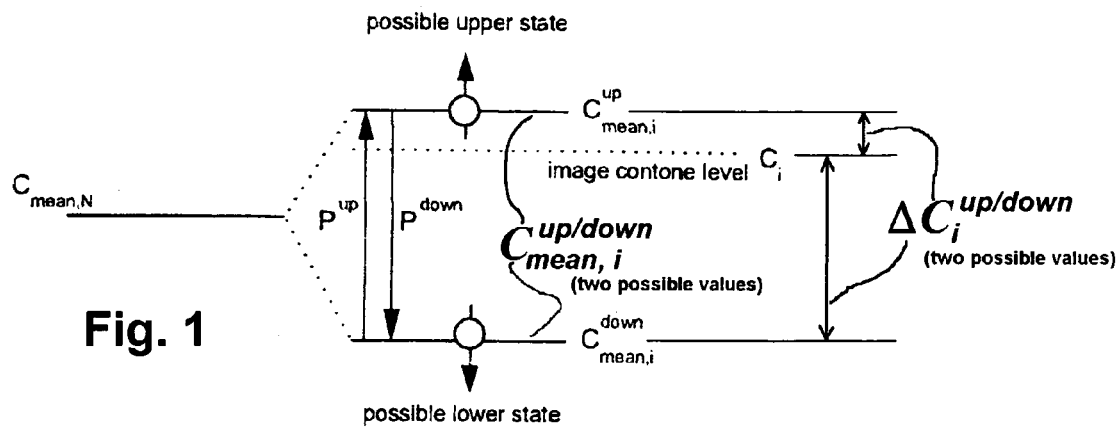
FIG. 1 is a diagram of so-called "energy" levels, in the rendition and masking model adopted in the present invention—particularly showing the relationships between input contone color levels, and printable states, and a construct called a "mean" value or state.

Digital or so-called "incremental" printing most commonly requires continuous-tone images to be represented by printers and some displays that are capable of only bilevel operation—i.e., either marking with full-saturation ink, or not marking at all. Such operation can be represented by a single binary bit.

Some printers and displays instead operate on a multilevel basis, having typically two or three binary bits and thus providing up to $2^3=8$ discrete levels. Some such operations may correspond to superposing plural dots of ink (sometimes ink of various densities or saturations, or different drop sizes)—or may instead be implemented by bilevel operation at the final output stage.

In any of these systems, dots must be arranged and printed so that the illusion of the original continuous-tone image is presented to the viewer. Digital halftoning provides the mechanism of rendering continuous-tone images on such devices.

Though several digital halftoning methods have evolved in the last three decades, the most popular and well-known techniques are matrix-based ordered dither and error diffusion. The latter produces aperiodic patterns with limited low-frequency components, a useful property, but its dispersed dots suffer from start-up delays, wormy structures and an excessive line smudging, which is especially objectionable on high-resolution devices and line drawings.

Ordered dither, on the other hand, is capable of clustering or dispersing the dots produced by using a properly designed dither matrix. However, a regular dither pattern is then clearly visible in the output picture.

As the market interest in desktop printers, digital copiers and industrial presses increases, the demand for faster and more efficient halftoning methods has forced algorithm designers to push the current implementations to their limits. In order to allow digital printing to further evolve to meet future demands, a fundamental change must occur in the halftoning process itself.

The challenge is to design a halftoning algorithm that combines the advantages of both traditional catego-ries and is capable to push their limits in an intuitive way that allows for straightforward customization.

The present invention provides a new method. It is mathematically analogous to the solution of a class of problems in physics—in particular, a two-dimensional Ising Spin Model—through the Metropolis Monte Carlo Algorithm.

The invention allows a simple, robust and highly flexible design mechanism of dither matrices for both digital halftoning and masking purposes. The digital halftoning technique presents several promising features.

Beyond preserving the image sharpening and the stochastic dot placement from the alternative error diffusion and the matrix-based dithering algorithms with low implementation complexity, the provides the capability of rendering a halftone image by output-dependent feedback.

Further the invention provides the ability to easily adapt the spectral properties of the halftoning algorithm to the local properties of the input image, e.g. its local gray-scale values or gradients. It is also adaptable to allow for interactions that cause clustering and other effects.

Moreover the invention algorithm is well suited to parallelism (thus overcoming a relatively high computation burden of this technique) and is also extensible to multilevel implementations that either consider different drop sizes or multiple drops per pixel. In addition, this approach offers further application potential in the field of mask generation, as the weighting matrix that controls the neighboring impact at a given image position may be reinterpreted as a constraint that conditions the pass selection during the masking process.

Below is a general overview of the so-called "Mean Field" method as developed for halftoning, and an outline of some basic components constituting the algorithmic approach. That information is followed by some results based on this concept and illustrated by means of practical examples. Certain recommendations for additional extensions of the invention are also included.

2. Matrix Design Algorithm with Adapted Mean Field Theory

The mean field theory is an approximate method for treating interactions in multiparticle systems in statistical physics, quantum mechanics (adiabatic approximation), mechanics, and fluid mechanics. In order to adapt the mean field theory to halftoning, we interpret each particular pixel of the halftoned image to be a single particle that can adopt different states depending on the configuration of its neighbors and the contone value that is acting on it.

While the term "state" may seem more appropriate in physics and mechanics, in referring to colors the word "value" may be more suitable. For purposes of the present document these two nomenclatures will be used interchangeably and may be considered synonymous.

For the sake of simplicity we assume that the number of states is restricted to two, which corresponds to a binary halftoning algorithm, and the contone value is normalized to range from −1 to 1. Consider a two-dimensional set of spins (these are equivalent to magnetic moments) $s_i$ that are equally spaced along the halftone matrix.

The spins can point in two directions only (up or down). For the present application, the "up" direction corresponds to a contone contribution of 1, and the "down" direction to a contone value of −1.

A particular configuration or microstate of the overall lattice is then simply a particular arrangement of spins, specified by the set of variables $s_1, s_2, \ldots, s_v$ for all lattice sites, where the index is kept one-dimensional and the total number v of sites is defined as the product $v = n_{rows} n_{cols}$ of the number of rows and number of columns that make up the image array.

In the simplest Ising model, spins interact with only their nearest neighbors N, defined over a weighting matrix w. The mean contone value at a given position i can be expressed through:

$$C_{mean,i}^{up/down} = \frac{\left(\sum_N w_j s_j\right) + s_i}{\left(\sum_N w_j\right) + 1} \tag{1}$$

$$= C_{mean,N} \pm \frac{1}{\left(\sum_N w_j\right) + 1}$$

where $s_i = \pm 1$.

The mean value is thus represented as a function of all the states in the near neighborhood N. The two sums are over nearest-neighbor pairs of spins, where $w_j$ determines the weights of their respective contributions.

The first expression shown as a quotient, above, is called in this document an "offset weighted average". It is "offset" from a simple weighted average—

$$\frac{\sum_N w_j s_j}{\sum_N w_j}$$

by the effects of the two additional terms $s_i$ and 1 in the numerator and denominator respectively.

Hence the terminology "offset" weighted average is simply meant to be descriptive. This phrase is accordingly used in certain of the appended claims.

The weights $w_j$ serve to emphasize the influence upon each pixel of its nearest neighboring pixels, while retaining significant interactive effect of pixels that are neighbors but progressively more remote. In purest principle all pixels in the image (or data array) exert some influence on all other pixels; however, as a practical matter the relative effect becomes so attenuated, beyond a few rows or columns at most, that little or no useful purpose is ordinarily served by propagating the response farther than that. This is particularly true for hybrid systems based at least partly on conventional error-diffusion arithmetic—whereas the classical Ising physics/mechanics applications discards no numbers at all.

If the above-presented Ising-style arithmetic is used for incremental-printing rendition or masking, nevertheless, some relatively remote cutoff is recommended. While the cutoff may be essentially arbitrary, empirical work is highly recommended to determine the sensitivity of colorimetric error—or of visually perceptible color error—to the distance and the contours of such a cutoff, because these variables are likely to depend very strongly on the specifics of any implementation developed.

The variable $C_{mean,i}$ can assume two different values ($C_{mean,i}^{down}$ or $C_{mean,i}^{up}$) depending on the sign of $s_i$. These differ from the desired contone value $C_i$ at i (see FIG. 1) by an amount:

$$\Delta C_i^{up/down} = |C_{mean,i}^{up/down} - C_i|. \tag{2}$$

Whereas $C_{mean,N}$ is the mean value generated by neighboring pixels without taking into account the particular pixel under observation, $C_{mean}^{up/down}$ additionally includes the effect—upon the mean value—of the pixel under study.

The system evolves through a number of independent spin flips. Each individual spin flip has an associated change $\Delta \underline{E}$ in the overall density distortion (energy) $\underline{E}$ of:

$$\Delta E(\text{for proposed flip}) = \Delta C^{after} - \Delta C^{before}. \quad (3)$$

The final target of minimizing the overall density distortion term E results in a likelihood of $P_i^{up/down}$ for a transition to occur. That probability, for the value range between 0 and 1, can be defined as:

$$P_i^{up/down} = \frac{\Delta C_i^{down/up}}{\Delta C_i^{down} + \Delta C_i^{up}}. \quad (4)$$

This is only one possible description of the probability function and of the interaction mechanism with the neighborhood over the mean density. Other dependencies can be introduced in order to allow for nonlinear effects, such as color linearization—and attractive or repulsive interactions that generate clustering or dispersion.

Next we consider a computer algorithm that attempts to emulate nature by selecting individual sites within the lattice at random and, for each selected site in turn, decides to flip or not flip the current spin. The decision is made based upon spin-flip probabilities given by a certain probability function.

The phrase "emulate nature" above alludes to the proposition that there is a natural way to represent or render an image. In that natural way, mutually neighboring regions perturb each other to produce an equilibrium condition, in which all the regions equally well correspond to the original image. After some number of passes through the lattice to dilute the initial spin assignment, this procedure generates spin configurations that naturally follow an assumed real probability function.

To simulate this model, we use a variation of the Metropolis algorithm. That algorithm does not specify how changes to the configuration should be made, but only says that any proposed change to the system should be accepted with a certain probability that depends on the change in energy.

How the changes are made depends on the variables and the model being studied, whenever it is ergodic and not biased in such a way as to violate detailed balance. Another issue is efficiency—the procedure should sample the configuration space as effectively as possible. There is often some freedom in tuning the algorithm to improve efficiency and performance.

In the context of the simulation of a system of spins, the steps of this algorithm can be summarized thus:

1) Establish an initial microstate—a random initial configuration of spins.

2) Make a random trial change in the microstate—choose a spin at random and flip it, $s_i \rightarrow s_j$.

3) Compute the probability $\overline{P}_i^{up/down}$ of finding the system in a particular state, the change in the average contone difference (or "energy") of the system due to the trial change.

4) Generate a random number r with a uniform distribution between 0 and 0.

5) If $r \leq \underline{P}_i^{up/down}$ accept the new microstate; otherwise, retain the previous microstate.

6) Repeat steps 2 through 5 to obtain a sufficient number of microstates.

Steps 2 through 5 give the conditional probability that the system is in microstate $s_j$ given that it was in microstate $s_i$. After testing v spins we say that a single Monte Carlo "sweep" of the lattice has been performed. A sweep is the natural unit in which to describe the length of a simulation.

Rather than going through the lattice in a random sequence it is also possible to pass through the lattice in its own natural, raster-like sequence (i.e. to test spins in the order in which the corresponding lattice elements or pixels appear, along successive rows). This procedure saves the generation of a random number, but has the drawback of reintroducing the objectionable directionality of conventional error diffusion.

The Metropolis algorithm for a spin model is well suited to parallelism, since it is both regular and local. Its regularity implies the possibility to use standard data decomposition of the lattice onto different processors in order to get a good load balance—and thereby, as noted earlier, achieve high throughput by overcoming the relatively high computational load of the overall procedure of this invention.

The local nature lets the update of a site depend only on its nearest neighbors $\overline{N}$ and thus restricts the communication requirements of the system. A limitation, however, is that all sites cannot be updated at the same time; that would violate what may be called "detailed balance", since a site and its nearest neighbors are mutually dependent.

3. Experimental Ising-Theory Results, and Recommendations

Figure 2:
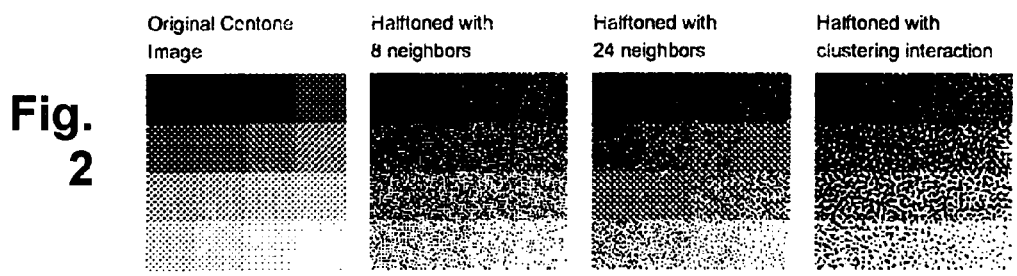
FIG. 2 is an image of a patch ramp (input tonal ramp) together with experimentally simulated halftoned versions of the ramp, using the present invention.

A preliminary specific implementation of the Metropolis halftoning algorithm has been developed in the Python programming language. Results (FIG. 2) already demonstrate excellent edge treatment—and promising possibilities offered by different interaction mechanisms.

Other workers interested in developing this capability are well advised to perform a detailed quality analysis of printed image samples, including thorough comparison with the outputs of matrix-based and error-diffusion rendition. It is also advisable to give ample attention to ensuring that any adopted computational implementation of the algorithm is highly efficient.

A key to successful algorithm design is adequate definition of the interaction mechanism. Systematic investigation of different interaction patterns is therefore strongly recommended, particularly their implication on the characteristics of the halftone output.

Controllability of cluster size, shape and periodicity over the nearest-neighbor matrix—and of the compensation of tonal change by means of the transition probability function—should be emphasized. In addition it is advisable to explore introduction of plane dependency.

All these recommended optimizations are well within the state of the art.

4. Advantages

Preferred embodiments of the invention preserve the image sharpening and the stochastic dot placement from the alternative error diffusion and the matrix-based dithering algorithms. This is accomplished with low implementation complexity.

In a very broad sense, the Ising-model rendering procedure of the present invention can be regarded as a special case of matrix-based dithering. According to the invention the matrix is generated in a very different way than in conventional matrix-based halftoning, and a number of variants are possible—particularly exploiting the fact that the matrix itself includes information about the image being rendered.

Still, once it has been generated the matrix is used in a way that is analogous to the conventional use of matrices in dithering. As noted below, individual cells of the matrix are compared with corresponding image-pixel data to determine whether to print at the subject pixel.

This matrix-dithering aspect of the Ising-model method also provides a link to printmasking. As will be seen, this connection facilitates a remarkable form of operation in which rendering and printmasking are consolidated.

Preferred embodiments of the present invention thus provide the capability of rendering a halftone image by output-dependent feedback. They also provide the ability to easily adapt the spectral properties of the halftoning algorithm to the local properties of the input image, e.g. its local gray values or gradients—as well as to allow for interactions that cause clustering and other effects.

Furthermore, the proposed algorithm is well suited to parallelism and extensible to multilevel implementations that either consider different drop sizes or multiple drops per pixel. In addition, this approach offers further application potential in several related—but heretofore not associated—functions, because the weighting matrix that controls the neighboring impact at a given image position may be reinterpreted and very remarkably broadened in its impact, in surprisingly diverse ways.

In particular, people skilled in this field will now understand that in the area of printmask generation the weighting pattern readily becomes the constraint that conditions pass selection during the masking process. Similarly in halftoning, since the weighting can be freely chosen, highly specialized filtering of the image can be effectuated simultaneously—to provide, for example, edge enhancement.

5. Consolidated Halftoning and Masking, and Adaptive Printing

As suggested in the earlier "BACKGROUND" section of this document, significant degradation of throughput results from conventional processing in which rendition and printmasking are separate processes—and particularly in which the number of passes is chosen at the outset, and used throughout the plot.

Different areas of a plot typically require different numbers of passes to complete a high-quality output. A light-sky region in a picture, for example, most often could be printed in two passes, while a patch of saturated green might require six or eight. This concern has never been addressed, or at least never resolved.

A more positive observation is that masking would benefit from advance information about the density of data to be printed. If the density in a particular area is very low, a small number of passes probably suffices, while printing high-density areas requires as many passes as the machine can muster.

Being able to adapt the number of passes to the minimum required at each area of the plot would have a significant beneficial impact upon throughput. No such feature is known heretofore.

Adapting the printmode to different sections of the image in fact yields a significant reward in throughput. The present invention provides matrices and an algorithm that enable such adaptive printing, while very greatly simplifying current printing pipelines.

Combining matrix-based halftoning and masking into a single step greatly simplifies pipeline implementation and design, and achieves high-quality output and higher printing speed through adaptability. This combination does have some limitations, such as a requirement for matrix-based halftoning (not always acceptable) and some restrictions imposed on halftoned-data manipulation.

The present invention combines matrix-based halftoning with masking—achieving well-masked, high-quality, adaptive output in a single step. It is a major simplification over the traditional approach, enabling a faster design process and giving the printmode designer fine-tuning control that has never been available heretofore.

Matrix-based halftoning works by using a fixed matrix of numbers as threshold for deciding whether to fire a drop. This matrix is carefully designed so that it has the right spectral characteristics (very low energy at low frequencies) and has a controlled distribution of values, from zero to the maximum possible in the image (typically 255).

The matrix is tiled over the image, and compared with tonal values in the image. If the image value at a particular pixel is higher than or equal to the superposed matrix value, the pixel will be printed. Thus all the pixels in a patch of tonal value 255 will in fact be printed, but only about half the dots in a patch of 128 (assuming a flat distribution).

Figure 3:
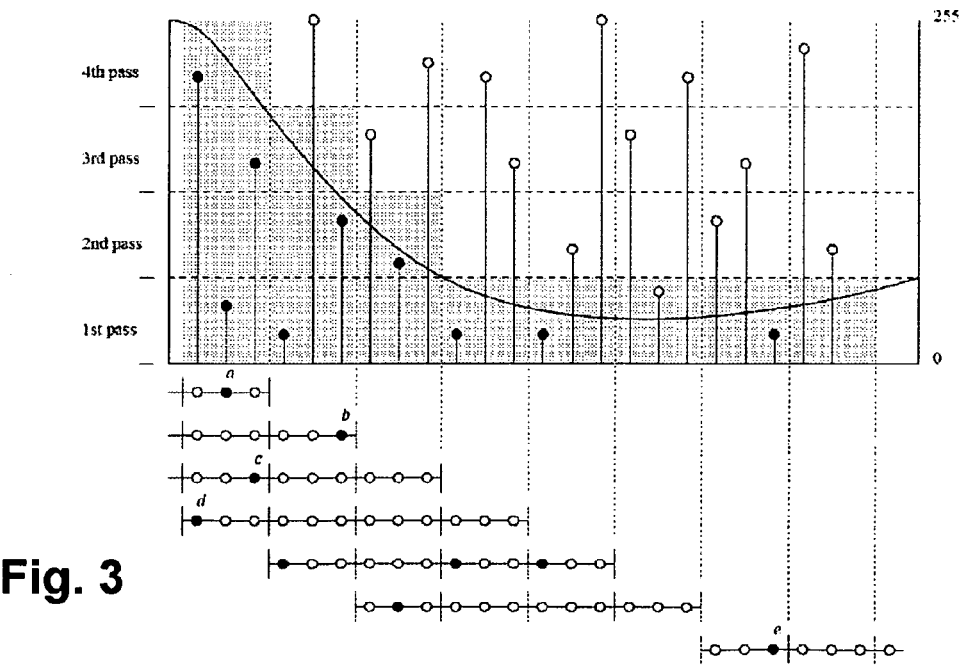
FIG. 3 is a conceptual diagram showing a printing process using combined halftoning and masking—in which the continuous line represents a plot to print; and the vertical spikes, the values in the halftoning matrix.

This much is somewhat familiar to those acquainted with dither masking for rendition purposes. In the printing process with combined masking and matrix halftoning, however, the halftoning mask is quantized (FIG. 3) into as many receptacles or "buckets" as the maximum number of passes required—four, in the illustrated case.

The plot to print may be represented by a continuous line, and the values in the halftoning matrix by vertical spikes. As the pen enters the image (from the left, FIG. 3) an image-analysis module "sees" that the first zone to print requires four passes, as the image reaches the highest bucket. That occurs in pass number one, so the pen is controlled to print the pixels whose halftoning-matrix values are in the first bucket (pixel a).

As it advances, the pen reaches a zone where the image covers only three buckets, so only three passes will be required. Being in pass two, the pen prints the pixels whose halftoning values are in bucket two (pixel b).

In pass three the pen reaches an area that will require only two passes. The pen prints pixel c, in the first zone, that had a halftoning value in the third bucket. Pass four finally reaches an area that will require only one pass to be printed, and prints pixel d.

After the next two passes, all the areas that the pen has visited have received as many passes as they required, and the pen can advance a full swath to print pixel e. It has already saved three advances—and printing of three corresponding subswaths—out of a possible total of ten.

There are two available generalizations to this algorithm. First, the buckets do not have to be of the same size. It evidently makes sense to quantize the halftoning matrix in different ways, fine-tuning the trade-off of image quality against throughput.

Second, it is also possible and permissible to use all available passes in a given area, regardless of how many that area itself needs. For example, suppose that the third advance (FIG. 3) requires only two passes, but due to restrictions in adjacent zones the pen must sweep over the corresponding two-pass area four times anyway.

In such a case there is no throughput penalty in requantizing the two buckets into four, and performing four passes in this zone. Such a refinement can be invoked automatically, and has the advantage of promoting or optimizing some basic functions of printmasking, as in particular the minimization of ink loading in each pass.

Standing back from the procedure detailed above, it can now be appreciated that—whereas conventional dither rendition makes a decision, for each pixel, of simply whether or not to print—the present invention instead makes a decision of whether or not to print in each pass, respectively. Yet the compound or "quantized" dither mask makes all these decisions concurrently.

A significant benefit of this integrated halftoning-and-masking approach is that halftoning and masking are intrinsically coordinated—i.e., this approach eliminates the incidence of unsynchronized and therefore possibly adverse interactions, between masking and halftoning. The pattern that each pass will print is determined by the halftoning matrix itself, and thus can be predicted, analyzed and refined.

In prototype work this invention has produced first estimations, with user images, showing average increases in throughput on the order of 20%. Such improvement is competitively significant.

Based upon this description, people skilled in the design of dither matrices and printmasks, and related programming, will readily see how to design such a matrix with associated algorithm to practice the invention. For artisans wishing to implement this invention, incorporation of several refinements is advisable, particularly for application to high-end printers.

One very important refinement is ability to implement error hiding (i.e., to conceal the effects of malfunctioning nozzles by firing nozzles that scan over the same image rows in other passes). Several possible strategies are available for such refinement.

Also advisable is accommodation of data manipulations that are sometimes inserted between the halftoning and masking stages, as for example black fortification. The algorithm is readily generalized to multibit halftoning, too. Also, printmasking can be consolidated with conventional (rather than Ising-model) halftoning.

6. Simultaneous Special-Effect Uses of Weighing Matrix

Image filtering allows application of various image effects such as noise removal, contrast sharpening, and modification of highlight contours. Many such image effects are produced through a mathematical function called "convolution"—used to recalculate the continuous-tone values in all of the channels at each pixel.

For conventional, well-known image adjustments, e.g. those found in commercial image-graphics software, these recalculations are performed in such a way as to incorporate influences from tonal values at surrounding pixels. Hence these computations are inherently compatible with the Ising-model development presented earlier in this document—which follows a very-broadly analogous plan.

Convolution filters are sometimes called "linear filters" because it is possible to represent them using common linear algebra, and in particular a simple matrix multiplication. As used in the present context, a convolution is a mathematical function which replaces every pixel in the image by a weighted sum of its neighboring pixels.

For purposes of this process a first matrix defines the group of pixels that are to be considered "neighboring" and also specifies the weight assigned to each neighbor. This first matrix—usually rather small, in number of pixels both across and down—is commonly called the "convolution kernel".

The rules for recomputation of the continuous-tone values at each pixel are given by another matrix of numerical values, the so-called "convolution matrix". In this pattern a central position contains a number that represents the tonal value(s) of the pixel being processed; while numbers in the other positions prescribe exactly how values from the neighbors are to be folded into the convolution.

This second matrix is applied to the data in each pixel of the image, in turn. As is entirely well-known in the imaging art, merely choosing different numerical values for this convolution matrix controls the process to generate a very wide range of visual effects. Application of these techniques within the context of the Ising-model development presented in this document, however, as a simultaneous processing that can be effectuated while halftoning (and while printmasking) is believed to be unique and even startling.

Visual effects that can be effectuated in this way include engraving/embossing, blurring, detecting or enhancing edges, and sharpening. Most classic image-manipulation effects are commonly achieved with three-by-three matrices; however, practice of the invention is by no means limited to such models.

The Ising-model halftoning process described earlier in this document uses the effects of neighboring pixels to compute spin-flip probabilities—i.e., the desirability of making each possible flip. In the simplest case, as will be appreciated by people skilled in this field, this effect of the nearest neighbors may be readily introduced through a human-visual-system model.

Such a model is most commonly represented by a Gaussian-curve processing window, or similar functional shape. Nearest-neighbor influences, however, can be perturbed by including an additional linear filtering effect of the kind described above.

Such perturbation requires no more than predefining a compound matrix, the result of a convolution between the visual-system model (or other defined nearest-neighbor weighting) and the desired filtering kernel. The compound matrix then provides—in a single step—the weights for the neighboring pixels.

7. Hardware for Implementing the Invention

The general preferred layout of apparatus for practice of this invention can vary greatly. The invention can be used in very large, floor-standing inkjet printer-plotters such as print posters or aircraft engineering drawings; and can be used in small, desk-model inkjet printers—and essentially any size unit in between.

The invention may be preferred for thermal-inkjet machines. It is also applicable, however, in piezo-inkjet systems and other very generally related devices such as hot-wax printers etc.

Accordingly no single apparatus picture or diagram, or description, should be regarded as particularly associated with the present invention. Representative apparatus is pictured and described in the many inkjet-system patents of the Hewlett-Packard Company, such as—merely by way of example—the previously mentioned U.S. Pat. No. 5,333,243 (FIGS. 26 through 32, together with associated text) and U.S. Pat. No. 6,542,258 (FIG. 44), as well as U.S. Pat. No. 5,276,970 (FIGS. 1 through 7) and U.S. Pat. No. 6,441,922 (FIGS. 12 through 18), and patents mentioned therein.

The foregoing disclosure is intended as merely exemplary. It is not intended to constrain the scope of the present invention—which is to be determined by reference to the appended claims.

What is claimed is:

1. A method for printing a digital-array representation of an input image having pixels of a given bit depth, said method comprising the steps of:

providing at a printing system the input image to be printed;

generating with an image pipeline module of the printing system a final processed form of the image having pixels of a reduced bit depth less than the given bit depth and compatible with tonal levels of the printing system by calculating, for substantially each particular pixel in the digital array, an offset weighted average of neighboring-pixel interactions with the particular pixel, wherein different non-zero weights are assigned to at least some neighboring pixels; and using the offset weighted averages to develop the final processed form of the image; and printing the final processed form of the image with the printing system.

2. The method of claim 1, wherein:
the using step comprises determining changes in the offset weighted averages, at substantially each stage in a series of successive approximations of values for the pixels of the image that converges to the final processed form of the image, wherein each stage in the series of successive approximations comprises calculating the offset weighted average for a plurality of the particular pixels in the digital array.

3. The method of claim 2, wherein:
the using step further comprises applying the changes to decide whether a value for the particular pixel, at a particular stage, should be modified in said particular stage to a different value in the next stage.

4. The method of claim 3, wherein:
the using step comprises calculating a probabilistic weight for use in determining whether to perform a modification of the assumed value of the particular pixel.

5. The method of claim 4, wherein:
the using step further comprises applying a randomly selected discriminator to modulate the calculated probabilistic weight, in determining whether or not to actually modify the assumed value.

6. The method of claim 4, wherein:
the modification is a level flip.

7. The method of claim 2, further comprising the step of:
finding the final processed form of the image, through convergence of a multiplicity of said successive approximations.

8. The method of claim 1, wherein:
the calculating step comprises finding each offset weighted average as $$\frac{S_{jk} + i_j}{S_k + 1}$$

where:
$S_{jk}$ represents the sum of products of the assumed value for the particular pixel j with weighted influences by neighboring pixels k,
$i_j$ represents possible values for a particular pixel j, and
$S_k$ represents the sum of said influences of the neighboring pixels k.

9. The method of claim 8, wherein:
each weighted average is offset from a simple weighted average by the terms $+i_j$ and $+1$, in numerator and denominator respectively.

10. The method of claim 8, wherein:
for a binary-value system, a particular binary value selected for the term $+i_j$ depends upon algebraic sign of the value $i_j$; and
for a multiple-discrete-value system, a particular discrete value selected for the term $+i_j$ depends upon a digital resolution, within the available multiple values, of the value $i_j$.

11. The method of claim 1, wherein:
each particular pixel in the digital array is selected in turn, for performance of the calculating and using steps, by random walk thru the array.

12. The method of claim 2, wherein the calculating, determining and using steps, considered in the aggregate, comprise:
defining discrete levels at the reduced bit depth and the error, if any, between each of them and the true contone level at each pixel at the given bit depth; but
no explicit distribution of error from each pixel, after its calculation, to neighboring pixels.

13. The method of claim 12, wherein:
said discrete levels are two binary levels.

14. The method of claim 12, wherein:
said discrete levels are multiple levels.

15. The method of claim 1, wherein:
the image processing comprises image rendering in preparation for incremental printing.

16. The method of claim 1, wherein:
the image processing comprises printmasking in preparation for incremental printing.

17. The method of claim 1, wherein the reduced bit depth is at least three bits less than the given bit depth.

18. The method of claim 1, wherein the image pipeline module comprises parallel processors each configured to process at least some different ones of the pixels of the input image.

19. The method of claim 1, wherein the digital-array representation of the input image and a digital-array representation of the final processed form of the image have substantially the same number of pixels.

20. The method of claim 1, wherein the neighboring-pixel interactions comprise interactions with the particular pixel of at least some nearest neighboring pixels disposed in the digital-array representation within one row and one column of the particular pixel, and of at least some non-nearest neighboring pixels disposed a plurality of rows or columns in the digital-array representation away from the particular pixel.

21. The method of claim 20, wherein the neighboring-pixel interactions disregard interactions with the particular pixel of the non-nearest neighboring pixels further than a particular number of rows or columns in the digital-array representation away from the particular pixel.

22. The method of claim 1, wherein the particular pixel has a defined value that is used in the calculating of the offset weighted average.

23. The method of claim 1, wherein:
the image processing comprises both image rendering and printmasking in preparation for incremental printing.

24. The method of claim 23, wherein the image rendering comprises matrix-based halftoning performed in an integrated procedure with the printmasking.

25. The method of claim 1, wherein a first neighboring pixel nearest to the particular pixel is assigned a higher non-zero weight, and a second neighboring pixel more remote from the particular pixel than the first neighboring pixel is assigned a lower non-zero weight.

26. A system for printing a digital-array representation of an input image having pixels of a given bit depth, comprising:
printing hardware configured to print a final processed form of the image that has pixels of a reduced bit depth that are compatible with tonal levels of the printing hardware; and
an image pipeline module configured to generate the final processed form of the image from the input image by calculating, for substantially each particular pixel in the digital-array representation, an offset weighted average of neighboring-pixel interactions with the particular pixel, wherein different non-zero weights are assigned to at least some neighboring pixels; and
using the offset weighted averages to develop the final processed form of the image.

27. The system of claim 26, wherein:
the image pipeline module is further configured to determine changes in the offset weighted averages, at substantially each stage in a series of successive approximations of values for the pixels of the image that converges to the final processed form of the image, wherein the offset weighted averages for a plurality of the particular pixels in the digital array is calculated at each stage in the series of successive approximations.

28. The system of claim 27, wherein:
the image pipeline module is further configured to apply the changes to decide whether a value for the particular pixel, at a particular stage, should be modified in said particular stage to a different value in the next stage.

29. The system of claim 28, wherein:
the image pipeline module is further configured to calculate a probabilistic weight for use in determining whether to perform a modification of the assumed value of the particular pixel.

30. The system of claim 29, wherein:
the image pipeline module is further configured to apply a randomly selected discriminator to modulate the calculated probabilistic weight, in determining whether or not to actually modify the assumed value.

31. The system of claim 29, wherein:
the modification is a level flip.

* * * * *